(12) United States Patent
Chiu

(10) Patent No.: US 7,205,753 B2
(45) Date of Patent: Apr. 17, 2007

(54) SWITCHING POWER SUPPLY SYSTEM FOR AUTOMATICALLY REGULATING CIRCUIT OPERATING POWER AND METHOD THEREOF

(75) Inventor: Yung-Cheng Chiu, Taipei (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/879,169

(22) Filed: Jun. 30, 2004

(65) Prior Publication Data

US 2006/0015762 A1  Jan. 19, 2006

(51) Int. Cl.
G05F 1/40 (2006.01)
G06F 1/26 (2006.01)

(52) U.S. Cl. .................. 323/283; 323/266; 713/321

(58) Field of Classification Search ............. 323/266, 323/267, 283, 284, 285, 351; 713/320, 321, 713/323
See application file for complete search history.

(56) References Cited

U.S. PATENT DOCUMENTS 5,657,257 A * 8/1997 Lee .................... 713/321
6,775,784 B1 * 8/2004 Park ................... 713/320
6,911,808 B1 * 6/2005 Shimamori ........... 323/283

\* cited by examiner

Primary Examiner—Jessica Han
(74) Attorney, Agent, or Firm—Troxell Law Office, PLLC

(57) ABSTRACT

The invention describes a switching power supply system for automatically regulating circuit operating power and the method thereof. The switching power supply system has a sensing and monitoring unit connected to the computer system for detecting the operating status of the computer system and outputting a detection value, a setting unit for setting a trigger condition value, a storage unit connected to the setting unit for storing the trigger condition value, a comparator unit connected to the storage unit and the sensing and monitoring unit for comparing the detection value with the trigger condition value and outputting a comparison result signal, and a dual power system switching regulator unit connected to the comparator unit and to the converter through at least one dual power system unit for receiving the comparison result signal and regulating connection/disconnection between the dual power system unit and the converter based on the comparison result signal.

13 Claims, 2 Drawing Sheets

SWITCHING POWER SUPPLY SYSTEM FOR AUTOMATICALLY REGULATING CIRCUIT OPERATING POWER AND METHOD THEREOF

BACKGROUND OF THE INVENTION

1. Field of the Invention

The present invention relates to a switching power supply system for automatically regulating circuit operating power and the method thereof, and particularly, to a switching power supply system, which is adapted to a computer system and is capable of automatically regulating circuit operating power, and the method thereof.

2. Description of the Related Art

Referring to FIG. 1, a schematic block diagram of a conventional switching power supply system is shown. The switching power supply system utilizes pulse width modulation (PWM) technology. Specifically, a PWM control circuit 18, which is connected to a DC converter 16, generates a control signal to control switching of a power switch in the DC converter 16. The DC converter 16 converts power from a dual power system (DPS) unit 17 connected to the DC converter 16 into DC power and supplies the DC power to the computer system through a filter network 12.

According to conventional technology employed in a computer system, the number of the dual power system (DPS) units that are turned on upon turning on the computer system is fixed and cannot be changed. Consequently, the number of the dual power system (DPS) units that are turned on cannot be changed in response to any current load variations resulting from execution of any software by any type of central processing unit (CPU), environmental variations inside/outside the housing and voltage variations caused by the power supply or by the load. Therefore, temperature variation of a single pulse-width modulation PWM, output current amount and power consumption of the power system for the central processing unit (CPU) are constant and thus the efficiency cannot be maximized in accordance with the changing environment.

SUMMARY OF THE INVENTION

In view of the above, the present invention discloses a switching power supply system for automatically regulating circuit operating power and the method thereof to provide a switching power supply system and a method for dynamically increasing or decreasing a number of dual power system (DPS) unit(s) that is (are) switched on. The present invention has excellent effects on the control of system power consumption and the control of system temperature.

In the present invention, a sensing and monitoring unit connected to the computer system detects a model number of the central processing unit (CPU), current consumption of the central processing unit (CPU), temperature change inside/outside the housing or at a predetermined point, voltage variations and load variations in the computer system and generates a detection value. The detection value is then transmitted to a comparator unit associated with the sensing and monitoring unit. Then, the comparator unit compares the detection value with a trigger condition value stored in a storage unit and outputs a comparison result signal to a dual power system switching regulator unit. The trigger condition value stored in the storage unit is obtained from a setting operation by a setting unit.

In the above description, the dual power system switching regulator unit dynamically switches on or switches off the at least one dual power system unit connected to the dual power system switching regulator unit based on the comparison result signal.

In the switching power supply system for automatically regulating circuit operating power and the method thereof according to the present invention, through dynamically monitoring the operating status change of the computer system by the sensing and monitoring unit, when the status change reaches beyond a pre-set trigger value, the dual power system switching regulator unit can dynamically switch on or switch off the at least one dual power system unit based on the comparison result signal to allow current output from a single pulse-width modulation (PWM). Thereby, it is possible to meet a user's requirements, to lower the temperature of the unit and to extend the lifespan of the unit. In addition, power consumption of the power system can be reduced to save more power.

BRIEF DESCRIPTION OF THE DRAWINGS

Features and advantages of the present invention will be fully understood from the detailed description to follow taken in conjunction with the embodiment as illustrated in the accompanying drawings, which are to be considered in all respects as illustrative and not restrictive, wherein.

DETAILED DESCRIPTION OF PREFERRED EMBODIMENTS

Figure 1:
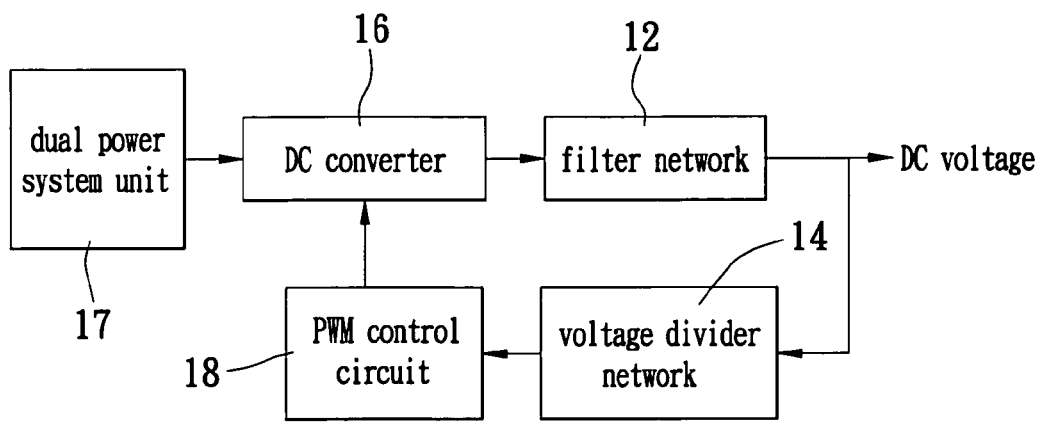
FIG. 1 schematically illustrates a block diagram of the conventional switching power supply system.
Figure 2:
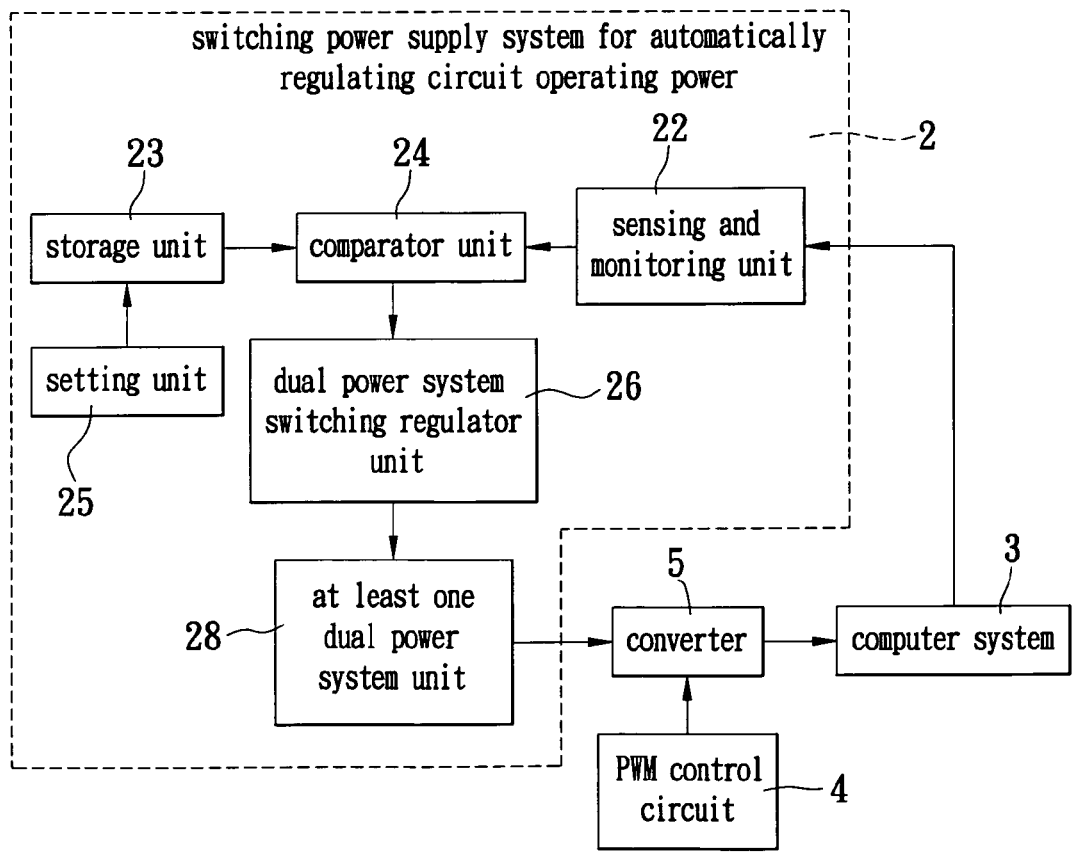
FIG. 2 schematically illustrates a block diagram of the switching power supply system for automatically regulating circuit operating power according to the present invention.

Referring to FIG. 2, a schematic block diagram of the switching power supply system for automatically regulating circuit operating power according to the present invention is shown. The switching power supply system for automatically regulating circuit operating power 2, which is used for regulating an operating power of a converter 5 and controlling switching of the converter 5 through a PWM control circuit 4 to supply a DC power to a computer system 3, includes a sensing and monitoring unit 22, a comparator unit 24, a dual power system switching regulator unit 26, at least one dual power system unit 28, a storage unit 23 and a setting unit 25.

Referring again to FIG. 2, the sensing and monitoring unit 22, which is connected to the computer system 3, detects an operating status of the computer system 3 and outputs a detection value. The setting unit 25, which is connected to the storage unit 23, is used for setting a trigger condition value and storing the trigger condition value into the storage unit 23. In the above description, the trigger condition value serves as a trigger condition value for regulating a number of the one dual power system unit(s) that is (are) switched on or switched off. The comparator unit 24, which is connected to the sensing and monitoring unit 22 and the storage unit 23 to receive the detection value from the sensing and monitoring unit 22 and the trigger condition value stored in the storage unit 23, carries out a comparison operation and outputs a comparison result signal. The dual power system switching regulator unit 26, which is connected to the comparator unit 24 and connected to the converter 5 through the at least one dual power system unit 28, receives the comparison result signal from the comparator unit 24 and dynamically and automatically switches on or switches off a number of the at least one dual power system unit 28 for the converter 5 based on the comparison result signal so that the converter 5 can supply power to the computer system 3 more efficiently.

Referring again to FIG. 2, the sensing and monitoring unit 22 includes a sensor (not shown) and a monitoring module (not shown). The sensor may be a voltage sensor, a current sensor, a temperature sensor, a load sensor or the like. The monitoring module may be a voltage monitoring module, a current monitoring module, a temperature monitoring module, a load monitoring module or the like. The sensing and monitoring unit 22 is connected to a key point (not shown) in the computer system 3 through the sensor so as to detect the operating status of the computer system 3. The monitoring module cooperates with the sensor so as to monitor dynamically the voltage, current, temperature or program load in the computer system 3 and then dynamically deliver an indication of the status change to the system.

In the above description, the sensing and monitoring unit 22 may consist of a combination of at least one sensor (not shown) and at least one monitoring module (not shown). The sensor may be a voltage sensor, a current sensor, a temperature sensor, a load sensor or the like. The monitoring module may be a voltage monitoring module, a current monitoring module, a temperature monitoring module, a load monitoring module or the like. The sensing and monitoring unit 22 is connected to multiple key points in the computer system 3 through those sensors so as to detect the environmental changes for the computer system 3 with higher sensitivity. The monitoring modules cooperate with the corresponding sensors so as to monitor dynamically the voltage, current, temperature and program load in the computer system 3 and then dynamically deliver indications of these status changes to the system.

Referring again to FIG. 2, the trigger condition value may be set through the setting unit 25 by a user upon power-on of the system. Moreover, a combination of multiple trigger condition values may be set in accordance with different demands. The trigger condition values are stored in the storage unit 23. In the subsequent process, the comparator unit 24 in the system compares the trigger condition values, which are set by the user, with the detection values, which indicate the system status and are output from the sensors, to determine whether the number of the dual power system unit 28 should be increased or decreased.

Under any operation system, when the computer system 3 is requested to run a heavy load program or a program that is to be executed for a long period of time, the system automatically switches on several dual power system units 28 according to the demand to supply a larger amount of electric current. When the system returns to a normal state or when the program terminates, the number of the dual power system units 28 that are switched on will be regulated back to the original number to save power for the system. During the process, it is not required to employ any software for switching operation, nor is it required to reset the computer system 3. No programs being run on the computer will be adversely affected by the switching process.

The invention may employ a single temperature monitor comprised of a temperature sensor and a temperature monitoring module. When temperature of a power switch MOS in a single pulse width modulation PWM control converter 5 is overheated, the system will automatically switch on the unused dual power system units 28 to reduce the current flowing through the single pulse width modulation PWM so that the temperature of the power switch MOS can be lowered. When the temperature of a power switch MOS in the single pulse width modulation PWM control converter 5 falls below a pre-set temperature, the dual power system switching regulator unit 26 will switch off the unnecessary output from the dual power system units 28. The present invention is advantageous because of its short response time and high compatibility. In addition, stability and efficiency can be maximized since modification or setting of the sensors is allowed to be carried out under any type of operation systems without resetting the computer system 3.

Figure 3:
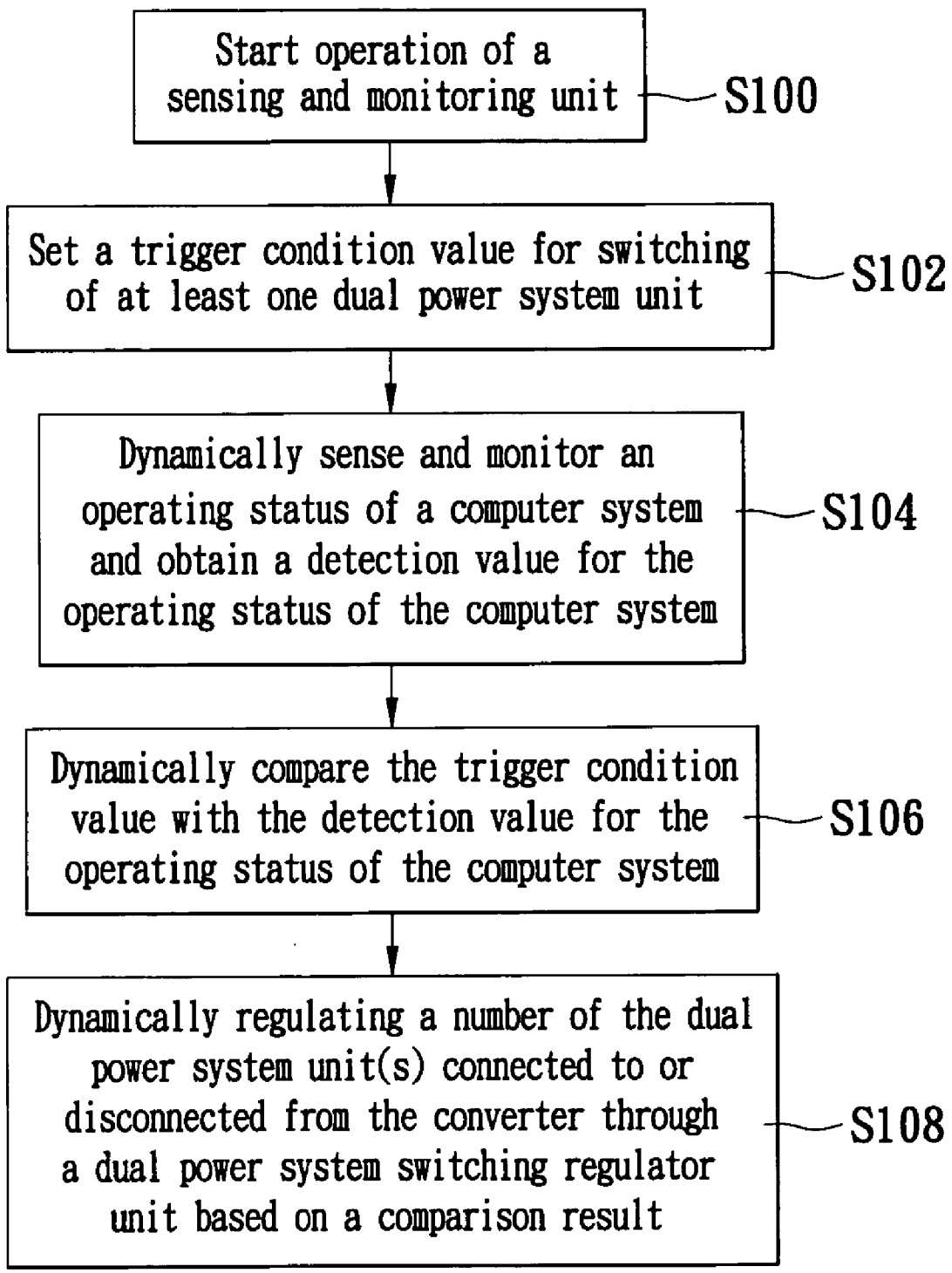
FIG. 3 is a flow chart for explaining the method for automatically regulating circuit operating power according to the present invention.

Referring to FIG. 3, a flow chart for explaining the method for automatically regulating circuit operating power according to the present invention is shown. The method for automatically regulating circuit operating power of the invention comprises the steps described as follows. First, operation of a sensing and monitoring unit is started (S100). Next, a trigger condition value is set for switching of at least one dual power system unit (S102). Then, an operating status of a computer system is dynamically sensed and monitored and a detection value is obtained for the operating status of the computer system (S104). Further, the trigger condition value is dynamically compared with the detection value for the operating status of the computer system (S106). Finally, a number of the dual power system unit(s) connected to or disconnected from the converter is dynamically regulated through a dual power system switching regulator unit based on a comparison result (S108).

Referring to both FIG. 2 and FIG. 3, the sensing and monitoring unit 22 includes a sensor (not shown) and a monitoring module (not shown). The sensor may be a voltage sensor, a current sensor, a temperature sensor, a load sensor or the like or a combination of any of these sensors. Each sensor cooperates with a corresponding monitoring module to monitor dynamically the status of the computer system 3 and accordingly outputs a detection value. The monitoring module may be a voltage monitoring module, a current monitoring module, a temperature monitoring module, a load monitoring module or the like.

In the above step of trigger condition setting, the trigger condition value can be set as a trigger condition value for a single sensor, or it can also be set as at least one trigger condition value for at least on sensor. In addition, the trigger condition value can be set as a factory default value and stored in the storage unit 23 of the computer system before shipping to customers, or it can also be set as a desired value by a user and stored in the storage unit 23 of the computer system upon turning on the computer system.

In the step of dynamically regulating a number of the dual power system unit(s) connected to or disconnected from the converter, the system compares the trigger condition value set by the user with the detection value from the sensing and monitoring unit 22 to determine whether or not the number of the dual power system unit(s) 28 should be regulated. The regulation of the dual power system unit(s) 28 may be carried out by switching on or switching off the dual power system unit(s) 28. Certainly, if the operating status does not change beyond the pre-set trigger condition value, then the number of the dual power system unit(s) 28 that is (are) switched on is maintained the same.

As described above, the switching power supply system for automatically regulating circuit operating power and the method thereof according to the present invention provide a switching power supply system and a method for dynamically increase or decrease the number of dual power system (DPS) unit(s) that is (are) switched on. The present invention has excellent effects on the control of system power consumption and the control of system temperature.

While the present invention has been described with reference to the detailed description and the drawings of the preferred embodiment thereof, it is to be understood that the invention should not be considered as limited thereby. Various modifications and changes could be conceived of by those skilled in the art without departing from the scope of the present invention, which is indicated by the appended claims.

What is claimed is:

1. A switching power supply system for automatically regulating circuit operating power of a converter and controlling switching of said converter through a PWM control circuit to supply a DC power to a computer system, comprising:
   a sensing and monitoring unit connected to said computer system for detecting an operating status of said computer system and outputting a detection value;
   a setting unit for setting trigger condition value to regulate the circuit operating power;
   a storage unit connected to said setting unit for storing said trigger condition value;
   a comparator unit connected to said storage unit and to said sensing and monitoring unit for comparing said detection value with said trigger condition value and outputting a comparison result signal; and
   a dual power system switching regulator unit connected to said comparator unit and connected to said converter through at least one dual power system unit, said dual power system switching regulator unit receiving said comparison result signal and regulating said dual power system unit to be connected to or disconnected from said converter based on said comparison result signal.

2. The switching power supply system for automatically regulating circuit operating power of claim 1, wherein said sensing and monitoring unit includes at least one sensor and at least one monitoring module.

3. The switching power supply system for automatically regulating circuit operating power of claim 2, wherein said sensor is any combination of a voltage sensor, a current sensor, a temperature sensor or a load sensor.

4. The switching power supply system for automatically regulating circuit operating power of claim 2, wherein said monitoring module is any combination of a voltage monitoring module, a current monitoring module, a temperature monitoring module or a load monitoring module.

5. The switching power supply system for automatically regulating circuit operating power of claim 1, wherein said sensing and monitoring unit include a sensor and a monitoring module.

6. The switching power supply system for automatically regulating circuit operating power of claim 5, wherein said sensor is a voltage sensor, a current sensor, a temperature sensor or a load sensor.

7. The switching power supply system for automatically regulating circuit operating power of claim 5, wherein said monitoring module is a voltage monitoring module, a current monitoring module, a temperature monitoring module or a load monitoring module.

8. A method for automatically regulating circuit operating power of a converter and controlling switching of said converter through a PWM control circuit to supply a DC power to a computer system, comprising the steps of:
   starting operation of a sensing and monitoring unit;
   setting a trigger condition value for switching of at least one dual power system unit;
   dynamically sensing and monitoring an operating status of said computer system and obtaining a detection value for the operating status of said computer system;
   dynamically comparing said trigger condition value with said detection value for the operating status of said computer system; and
   dynamically regulating a number of said dual power system unit(s) connected to or disconnected from said converter through a dual power system switching regulator unit based on a comparison result.

9. The method for automatically regulating circuit operating power of claim 8, wherein the step of setting said trigger condition value comprises setting a single trigger condition value for a single sensor.

10. The method for automatically regulating circuit operating power of claim 8, wherein the step of setting said trigger condition value comprises setting at least one trigger condition value for at least one sensor.

11. The method for automatically regulating circuit operating power of claim 8, wherein the step of setting said trigger condition value comprises setting and storing said trigger condition value in a storage unit of said computer system as a factory default value.

12. The method for automatically regulating circuit operating power of claim 8, wherein the step of setting said trigger condition value comprises setting said trigger condition value by a user and storing said trigger condition value in a storage unit of said computer system upon power-on of said computer system.

13. The method for automatically regulating circuit operating power of claim 8, wherein the step of dynamically regulating a number of said dual power system unit(s) connected to or disconnected from said converter includes a regulation of switching on or switching off.

* * * * *